Feb. 28, 1961

R. E. HOVDA 2,973,513

GAS DISCHARGE VALVE NOISE GENERATOR

Filed April 5, 1957

INVENTOR.
ROBERT E. HOVDA
BY
*Lewis L. Humphries*
ATTORNEY

INVENTOR.
ROBERT E. HOVDA

United States Patent Office 2,973,513
Patented Feb. 28, 1961

2,973,513
GAS DISCHARGE VALVE NOISE GENERATOR

Robert E. Hovda, Buena Park, Calif., assignor to North American Aviation, Inc.

Filed Apr. 5, 1957, Ser. No. 650,994

11 Claims. (Cl. 343—17.7)

This invention relates to a gas discharge valve noise generator for checking the sensitivity of a radio frequency receiver, and more particularly, to a method and apparatus for utilizing for such a purpose a gas discharge duplexing valve which is normally used in a receiving-transmitting system.

Normally, to make an accurate sensitivity check on a receiver, especially on receivers operating in the microwave range, the use of a relatively bulky calibrated signal generator is required. Accurate signal generators are usually very expensive, and such tests generally require the services of a skilled technician. If a receiving-transmitting system is involved, for example as in a radar set, the signal generator must be connected to the receiver through a device such as a directional coupler. If no directional coupler is provided, such a test may require the disconnection of the antenna feed system in order to properly couple in the test signal. All of this makes for a complicated and laborious test procedure which is especially difficult under field operating conditions.

This invention proposes to overcome these difficulties by utilizing a duplexing (T-R) tube as a noise generator. As such a duplexing tube is often used in transmitting-receiving systems as an aid in feeding both transmitter and receiver to the same antenna, the use of such a device as a signal generator obviates the necessity for external sensitivity measuring equipment.

Such a duplexing tube can be made to generate noise signals by modifications to any duplexed transmitting-receiving system. A peak reading vacuum tube voltmeter or an "A" scope indicator which may be part of the built-in test equipment of such a system can be utilized for taking sensitivity readings. All that is required is that these sensitivity readings be pre-calibrated for any particular system.

It is, therefore, an object of this invention to facilitate the checking of radio frequency receiver sensitivity.

It is a further object of this invention to obviate the necessity for using expensive and complicated test equipment in checking radio frequency receiver sensitivity.

Another object of this invention is to provide a simple accurate device for checking radar receiver sensitivity.

It is a still further object of this invention to enable relatively unskilled personnel to check radio frequency receiver sensitivity under field operating conditions.

It is another object of this invention to provide a new improved method for checking receiver sensitivity in transmitting-receiving systems.

It is still another object of this invention to provide apparatus for utilizing a duplexing valve normally used in a transmitting-receiving system as a signal generator.

Other objects of this invention will become apparent from the following description taken in connection with the accompanying drawings in which.

Figure 1:
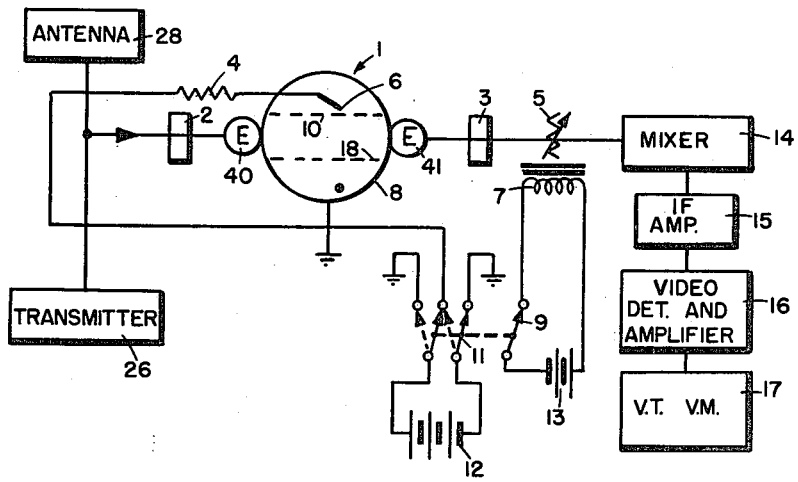
Fig. 1 is a schematic drawing of a first embodiment of the invention.

In a transmitting-receiving system such as a radar set incorporates, a duplexing system must be utilized to allow for transmission and reception on the same antenna system without injury to the receiver or undesirable attenuation of received and/or transmitted signals. In most such modern systems, a duplexing valve, which is also commonly known as a T-R tube, is utilized for this purpose. This type of tube consists of a gas filled envelope in which two closely spaced electrodes are mounted. The gas is kept slightly ionized by the application of an igniter voltage. This igniter voltage is applied between a small probe known as the igniter cathode and a relatively large surface which generally coincides with the envelope of the tube which is known as the igniter anode. The duplexing valve is placed within the antenna feed system in such a position that when the transmitter emits, it will cause a large discharge current between the closely spaced discharge electrodes thereof. This discharge current effectively short circuits the transmission line at the input of the valve, and the short circuit is in such a position that the emitted energy is unimpeded. This gas discharge presents a short circuit across the receiver input terminals and, in this manner, the transmitted energy is effectively prevented from entering the receiver in any but a nominal amount. The full details of conventional duplexing systems are included in chapter XI, Principles of Radar by the MIT Radar School Staff, 1946 edition.

When such a duplexing valve is excited in such a manner that its discharge current density rises appreciably, it becomes an excellent generator of noise signals. The nature of the noise signals emitted classifies them as "white" noise which is extremely broad in its spectrum coverage. Experimental data indicates that such a "white" noise generator gives fairly constant output over the radio frequency range from 15 kc. to at least 18,000 mcs. The broad band characteristics of "white" noise, as generated by such a discharge device, are analyzed in detail in an article entitled Broad Band Microwave Noise Source by W. W. Mumford on pages 608–618 of volume 28 of the Bell System Technical Journal (1949).

It is highly undesirable to have a duplexing valve generate "white" noise under ordinary reception conditions as such noise would interfere with normal reception of signals. For this reason, duplexing valves are specifically designed not to generate noise except, of course, when forced to do so during transmission. This is accomplished for the most part by:

(1) Restricting the area of the igniter cathode. It is found that if the cathode area is not so restricted, the duplexing valve will oscillate continuously as a relaxation oscillator. Accordingly, in most duplexing valves, the cathode is a small probe while the anode is usually coincidental with the outer shell of the valve.

(2) Keeping the igniter voltage low. If the igniter voltage is raised above a certain value, a sufficient discharge current will flow to generate noise signals continuously. The igniter voltage is therefore kept at lowest point possible for ionization of the gas which is known as the "keep alive" voltage.

Referring to Fig. 1, a first embodiment of the invention is shown in which the duplexing valve is caused to oscillate as a relaxation oscillator. When the tube oscillates, discharge current density builds up periodically thereby generating noise pulses. The duplexing valve 1 is shown in its normal position in a conventional receiving-transmitting system. The antenna 28 is coupled by a transmission line such as a wave guide 2 to the transmitter 26 and the duplexing valve. The wave guide is illustrative of only one suitable means which might be used for this coupling purpose in a particular system. A coaxial line (solid or gas di-electric) or any other suitable transmission line might also be utilized. As indicated, the wave guide is E plane coupled (i.e. coupled in the plane of the electric field) to the duplexing tube by conventional couplings means 40. The other side of the duplexing tube is E plane coupled by conventional coupling means 41 to another wave guide section 3 and then to the mixer stage 14 of the receiver.

Figure 5:
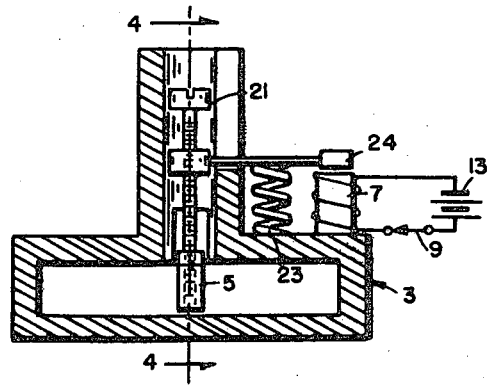
Figs. 4 and 5 are elevational views of a step attenuator which may be utilized in the device of the invention.
Figure 4:
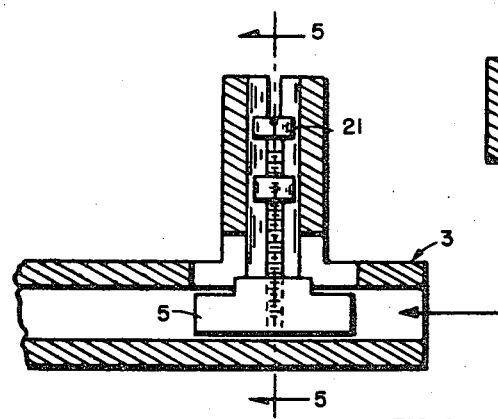

Inserted in the wave guide section 3 is a step attenuator 5 illustrated in Figs. 4 and 5. This step attenuator should be adjustable. Experimentation indicates that adjustment from approximately 11 to 13 decibels of attenuation will suffice for most installations. Attenuation is either inserted in the line or removed by the control action of solenoid 7. When the solenoid is actuated by closing switch 9 thereby applying current from current source 13 as indicated in Fig. 5, the solenoid arm 24 is pulled down by magnetic action. This arm is attached to the step attenuator 5 which thereby is inserted into the wave guide 3 to provide attenuation. When the switch 9 is open, action of spring 23 causes the attenuator to move out of the wave guide thereby eliminating all attenuation. The attenuator may be fabricated of any suitable material. For microwave purposes a ferrite material is commonly used. Attenuation adjustment may be accomplished by means of a screw 21 which can be turned to vary the amount of attenuator penetration into the wave guide when the switch 9 is closed.

As pointed out above, if the duplexing tube can be made to oscillate, it will generate noise signals. Experimentation indicates that if the cathode is made to have a large surface area, such oscillations will be sustained. The conventional duplexing valve such as the type 1B63A manufactured by Sylvania and others has been designed so that it will not oscillate by keeping the surface area of the cathode very small. Referring to Fig. 1, this cathode is in form of a small probe 6. The anode, on the other hand, coincides with the entire shell of the duplexing valve 8 which is made of metal. By reversing these two elements, that is, by making 8 the cathode and 6 the anode, conditions for oscillation will be fulfilled. This can readily be accomplished by reversing the normal igniter voltage from direct current power source 12 thereby connecting the negative terminal of the supply to igniter anode 8 and the positive terminal of the supply to igniter cathode 6 as indicated in Fig. 1. Switch 11 is used to accomplish this result.

It is necessary to throw a fixed amount of attenuation into the section of wave guide 3 between the duplexing valve 1 and the receiver mixer 14 due to the high amplitude of noise signal generated by the duplexing valve. Experimentation indicates that attenuations of the order of 12 decibels will suffice in most cases. However, this requirement may vary in individual applications. The attenuation should be adjustable within three or so decibels to allow for accurate calibration of test noise signals.

Switches 9 and 11 are ganged together as they must be actuated simultaneously. That is, when the duplexing valve is caused to oscillate by reversing the polarity of the igniter voltage, the step attenuator should be thrown into the wave guide. Resistor 4 is a current limiting resistor which is generally utilized in the anode-cathode igniter circuits of duplexing valves to keep the igniter current within pre-designed limits.

When the polarity of igniter voltage is reversed, duplexing valve 1 operates as a relaxation oscillator at a frequency determined by the capacitance between the igniter cathode 6 and the wave guide 2, the gap dimension between discharge electrodes 10 and 18, the resistance of the igniter current limiting resistor 4, and the igniter voltage supplied by current source 12. Frequency of oscillation is of no significant consequence in sensitivity measurements if the response of the peak reading device is not frequency sensitive. After the noise signals enter the mixer 14 where they are converted to an intermediate frequency in conventional fashion, they are amplified in intermediate frequency amplifier 15 and then detected and amplified as video signals in video detector and amplifier 16. A peak reading vacuum tube voltmeter 17 is utilized to read the amplitude of these video noise signals at the output of the receiver. A cathode ray oscilloscope or any other suitable peak reading device can be used in lieu of this voltmeter.

To insure accurate sensitivity measurements, each receiving-transmitting system should be accurately calibrated in terms of peak reading vacuum tube voltmeter readings. This can be accomplished by comparing results attained with the duplexing valve with those obtained with accurate laboratory test equipment before the system is sent into the field. The step attenuator 5 should be adjusted by means of screw 21 (Figs. 1, 4 and 5) to give a predetermined vacuum tube voltmeter reading when the duplexing tube is caused to oscillate. Subsequently, in the field, if this vacuum tube voltmeter reading or any predetermined minimum reading is not achieved when the switches are thrown, this will indicate sub par receiver sensitivity. A calibration chart can also be prepared to indicate absolute receiver sensitivities in terms of voltmeter readings.

A typical calibration procedure utilizing a standard noise generator such as for example the model 2200 made by Waveline Inc. of Caldwell, N.J., might be as follows:

(1) Connect the output of the model 2200 noise generator to the receiver input through a continuously adjustably attenuator such as the Hewlett Packard model 382A.

(2) With the noise generator turned off, set the receiver gain to give 2 volts peak voltage reading on a vacuum tube voltmeter connected to the receiver output.

(3) Turn the noise generator on and adjust the model 382A attenuator until the voltmeter reads 2.8 volts. (The receiver noise figure, which is an accurate measure of receiver sensitivity, can be calculated by subtracting the amount of attenuation of the model 382A attenuator from the known value of noise generated by the model 2200 noise generator. It is assumed that this sensitivity is normal or that the receiver will be adjusted until it is before proceeding to the next step.)

(4) Turn the model 2200 noise generator off and remove it and the attenuator model 382A from the receiver input circuit. Couple the receiver to the wave guide and the duplexing valve with the connections made as under normal operating conditions. Set receiver gain to give .6 volt reading on the vacuum tube voltmeter. Close switch 9 thereby causing the duplexing valve to generate noise signals and throwing attenuator 5 into the wave guide. Adjust attenuator screw 21 until the vacuum tube voltmeter reads 3 volts. The latitude from .6 volt with no signal to 3 volts with noise signal input is allowed to facilitate meter readings in the field by permitting a greater range of acceptance voltage readings (from 2–3 volts).

The receiver having been calibrated against a sensitivity standard, a minimum acceptable sensitivity standard can be set up in terms of vacuum tube voltmeter readings. Although laboratory or factory standard might be 3 volts, a minimum standard of for example 2 volts might be acceptable in the field. On subsequent field checks then, any time the vacuum tube voltmeter reads below 2 volts when switch 9 is actuated, sub par receiver sensitivity is indicated, and maintenance action should be taken.

Experimental data indicates that production duplexing valves tend to generate fairly uniform noise signal outputs. Extreme output ranges of numerous duplexing valves checked varied about plus or minus 1 decibel. It is felt that if noise output were made a critical manufacturing specification on such devices that this variation could be greatly narrowed as no effort is made along these lines at present. It is true that aging of the duplexing tube might reduce its noise output. However, such output does not drop off gradually and tends rather to deteriorate rapidly with failure of the valve as a duplexer. If such noise output is materially reduced, this duplexing valve is not functioning properly and should be replaced. At any rate, low readings on the vacuum tube voltmeter is a definite indication of malfunctioning of the system and gives the operator a quick indication that some maintenance work is required.

Figure 2:
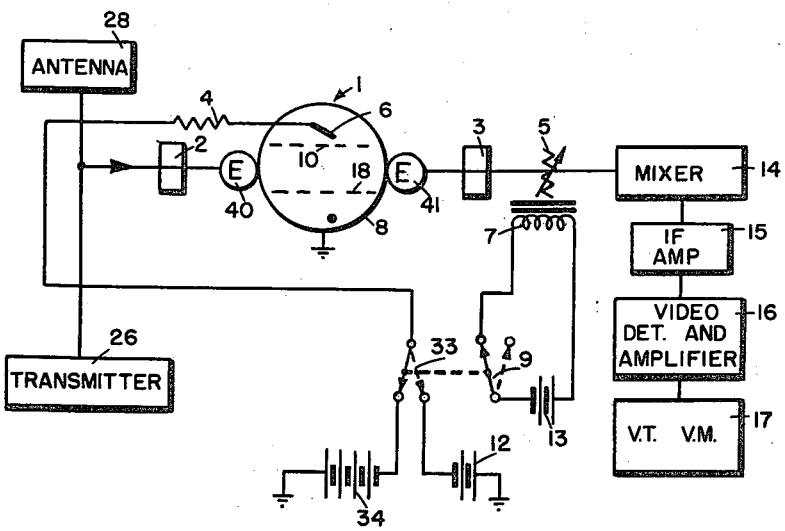
Fig. 2 is a schematic drawing of a second embodiment of the invention.

Referring to Fig. 2, a second embodiment of the invention is shown. In this embodiment, the discharge current density in duplexing valve 1 is raised thereby causing the vlave to generate noise signals by the application of a high voltage from direct current source 34 between igniter anode 8 and igniter cathode 6, with the positive terminal connected to the anode and the negative terminal to the cathode. Normal igniter voltage supplied by direct current source 12 might be, for example, 700 volts with a type 1B63A duplexing valve. By raising this voltage to 1500 volts as delivered by power source 34, the duplexing valve becomes an excellent noise generator. This voltage change can be made by a switch 33, which is ganged to solenoid switch 9. As described for the first embodiment, when solenoid switch 9 is closed, solenoid 7 is actuated and throws step attenuator 5 into wave guide 3.

Except for the means of generating the noise signal, the functioning and adjustment of the embodiment shown in Fig. 2 is the same as that described for the embodiment of Fig. 1.

Figure 3:
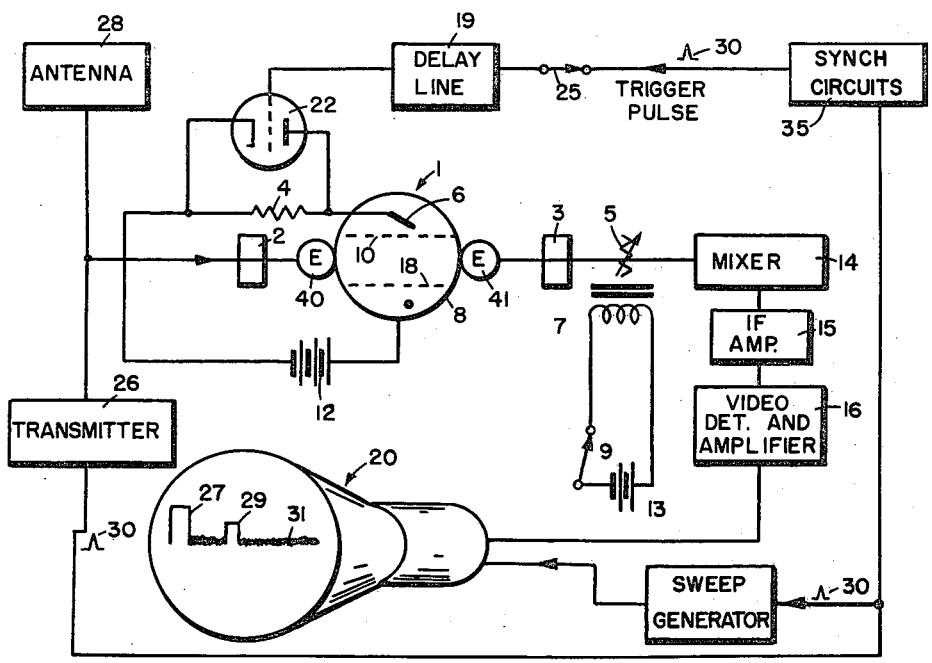
Fig. 3 is a schematic drawing of a third embodiment of the invention.

Referring to Fig. 3, an embodiment of the invention is shown in which discharge current density is raised and noise pulses are thereby generated by bypassing the igniter current limiting resistor 4 with a low impedance. A low impedance switch such as vacuum tube triode 22 has its anode connected to one end of this resistor 4 while the cathode is connected to the other end. The current limiting resistor 4 is connected at the end common with the triode's cathode to the negative terminal of igniter voltage source 12 and at the end common with the triode's anode to igniter cathode 6. The grid of triode 22 is connected through a delay line 19 to switch 25. Trigger pulse 30 is generated in the synchronizing circuit 35 of the radar system. This trigger pulse is also utilized to key the transmitter 26.

When switch 25 is closed, this trigger, delayed by delay line 19 will key triode 22. When this triode is keyed, a current flow between cathode and anode of the triode will result thereby effectively lowering the impedance in parallel with limiting resistor 4. Lowering the impedance in the igniter anode, cathode supply voltage circuit will raise the discharge current density in the duplexing valve 1 high enough to result in substantial noise signals. In this manner, noise pulses are generated in accordance with a delayed transmitter pulse. It is necessary to delay this pulse by any amount reasonably necessary to make it distinguishable from the transmitter pulse on the indicating device utilized. The current limiting resistor 4 may be eliminated if the impedance of the triode when not being keyed is of the order of 2–6 megohms.

The device keyed need not be a triode vacuum tube and can be any suitable means for selectively decreasing the igniter circuit impedance. Solenoid switch 9 should be closed simultaneously with trigger switch 25 to throw attenuator 5 into the wave guide 3 as described previously. The other elements of this embodiment are the same as that described for the embodiment of Fig. 1 except that following the video detector and amplifier is an "A" scope cathode ray indicator tube in place of the vacuum tube voltmeter. This indicator tube should preferably be one that is part of the radar system, but can be one specially installed, or can be a cathode ray oscilloscope. The indicating means used should be suitably driven by a sweep generator 32 which is synchronized with the transmitter 26 by trigger pulse 30. The signals are viewed by the operator on the face of cathode ray tube 20. The noise pulse 29 appears at a finite distance (time delay) from the transmitter pulse 27. Ambient noise or "grass" 31 will appear below the generated noise signal level.

The radar system should be calibrated in conjunction with laboratory equipment so that with receiver gain set to give a predetermined amplitude of "grass" 31, when noise signals are generated and the attenuator is thrown into the wave guide by closing switches 25 and 9, a noise pulse 29 of a predetermined amplitude will appear on the "A" scope as related to the grass amplitude.

Using a calibrated pulsed signal generator such as a Hewlett Packard model HP624C fed into the receiver input terminals, the attenuator on the signal generator should be adjusted to give a pulsed signal just above the "grass" level. Receiver sensitivity can now be read directly on the attenuator dial. If low sensitivity is indicated, the receiver should be adjusted to correct this before proceeding further. The receiver should then be connected to the antenna feed as it is under normal operating conditions and the transmitter turned on. Switches 25 and 9 should then be closed thereby causing the generation of noise signals and throwing step attenuator 5 into the wave guide. The attenuator screw 21 should now be adjusted until the pulse 29 on the "A" scope is just above the grass level. Subsequently, in the field, an operator can quickly determine whether or not his receiver is functioning within predetermined tolerances by throwing switches 25 and 9 and checking the amplitude of pulse 29. If this pulse is not readily discernible just above the "grass" level, low sensitivity is indicated.

While the means for checking receiver sensitivity has been shown for a radar system in this embodiment, it could be equally applied to any radio frequency transmitting-receiving system in which a gas discharge duplexing valve is utilized. If so desired, a simple switch-resistor combination can be used in place of triode 22 and connected in parallel with resistor 4 to cause the generation of noise signals, and these can be read on a peak reading vacuum tube voltmeter as in the first and second embodiments.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A method for checking the sensitivity of a radio frequency receiver in a transmitting-receiving system utilizing a gas discharge duplexing valve to accomplish duplex operation of the transmitter and receiver on a single antenna, said discharge valve having a direct current source in series with an impedance connected between its igniter anode and cathode, comprising the steps of setting said receiver in normal operating condition, exciting said duplexing valve to raise its discharge current density thereby generating noise signals, measuring the amplitude of said noise signals at the output of said receiver, and comparing said amplitude with a predetermined sensitivity standard.

2. A method for checking the sensitivity of a radio frequency receiver in a transmitting-receiving system utilizing a gas discharge duplexing valve to accomplish duplex operation of the transmitter and receiver on a single antenna, a direct current source being connected with its positive terminal coupled to the igniter anode of said valve and its negative terminal coupled to the igniter cathode of said valve, comprising the steps of setting said receiver in normal operating condition, coupling the positive terminal of said direct current source to said igniter cathode and the negative terminal of said direct current source to said igniter anode, thereby causing said duplexing valve to oscillate and generate noise signals, measuring the amplitude of said noise signals at the output of said receiver, and comparing said amplitude with a predetermined sensitivity standard.

3. The method recited in claim 1 wherein said duplexing valve is excited to raise its discharge current density by increasing the voltage between the igniter anode and cathode of said duplexing valve.

4. The method recited in claim 1 wherein said duplexing valve is excited to raise its discharge current density by lowering the series impedance in the igniter circuit of said duplexing valve.

5. The method recited in claim 1 including the step of attenuating the noise signals fed to the receiver from said valve.

6. A method for checking the sensitivity of a radio frequency receiver operating in conjunction with a radio frequency pulsed transmitter and having a gas discharge duplexing valve in its antenna feed circuitry to permit transmitting and receiving on the same antenna comprising the steps of setting said receiver and transmitter in normal operating condition, causing the discharge current density in said duplexing valve to increase in response to a delayed transmitter pulse thereby generating noise signals, measuring the amplitude of said noise signals at the output of said receiver, and comparing said amplitude with a predetermined sensitivity standard amplitude.

7. The method recited in claim 6 wherein the step of causing the discharge current density in said duplexing valve to increase in response to a delayed transmitter pulse includes the step of keying with said pulse an electronic valve connected in series with the igniter current supply of said duplexing valve.

8. In combination, a radio frequency receiver, a gas discharge duplexing valve connected to the input of said receiver, said valve having igniter electrodes, a direct current power source operatively connected to said igniter electrodes, and switch means for selectively reversing the polarity of the connection of said direct current power source between said electrodes, whereby said duplexing valve is caused to generate noise signals.

9. In combination, a radio frequency transmitter, a radio frequency receiver, an antenna system, a gas discharge duplexing valve having at least an igniter anode and cathode connected between said receiver transmitter, and antenna system, a direct current power source connected between said igniter anode and cathode, the positive terminal of said power source being connected to said anode and the negative terminal of said power source being connected to said cathode, a current limiting impedance connected between said power source and said igniter cathode, switch means connected across said current limiting impedance for selectively bypassing said current limiting impedance, and indicator means for presenting signals received by said receiver.

10. The device recited in claim 9 in which said switch means comprises an electronic valve.

11. In a radar system, a pulsed transmitter, a receiver, an "A" scope indicator, an antenna system, a gas discharge duplexing valve having at least an igniter anode and cathode and connected between said receiver and said antenna system, a D.-C. voltage source, the positive terminal of said source being coupled to said igniter anode, the negative terminal of said voltage source being coupled to said igniter cathode, a current limiting impedance connected between said voltage source and said igniter cathode, an electronic valve having at least anode, cathode and control electrodes, the anode of said electronic valve being connected to one end of said impedance, the cathode of said electronic valve being connected to the other end of said impedance, means for generating pulses at a predetermined frequency to key said transmitter, a delay line adapted to delay said pulses a predetermined amount, and means for feeding said delayed pulses to said control electrode of said electronic valve.

References Cited in the file of this patent

UNITED STATES PATENTS

| | | |
|---|---|---|
| 2,505,534 | Fiske | Apr. 25, 1950 |
| 2,691,098 | Selove | Oct. 5, 1954 |